Figure 7:
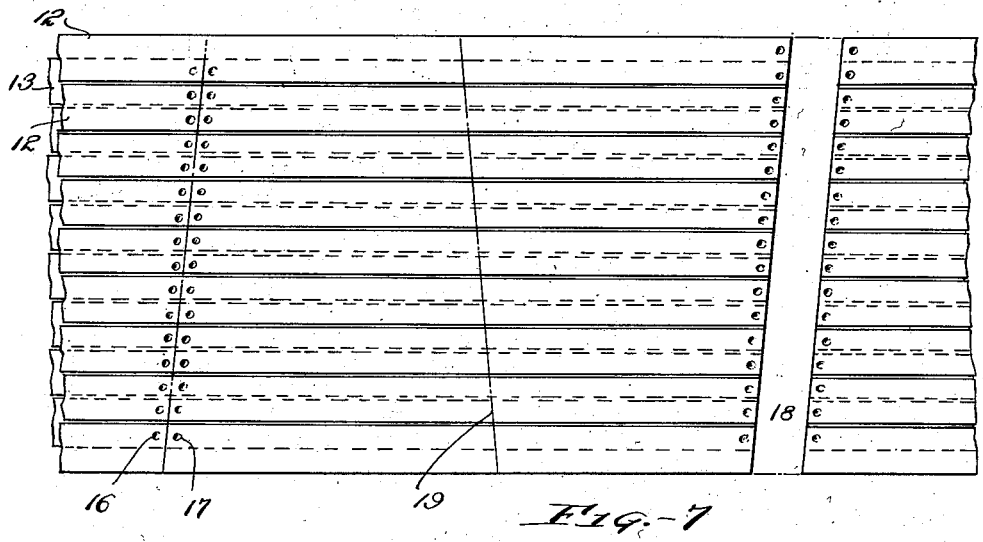

May 4, 1926.　　　　　　　　　　　　　　　　　　　　1,583,546
A. R. GOLDRICK
VEHICLE SPRING COVER AND METHOD OF ASSEMBLING THE SAME
Filed Dec. 20, 1923　　　　2 Sheets-Sheet 1
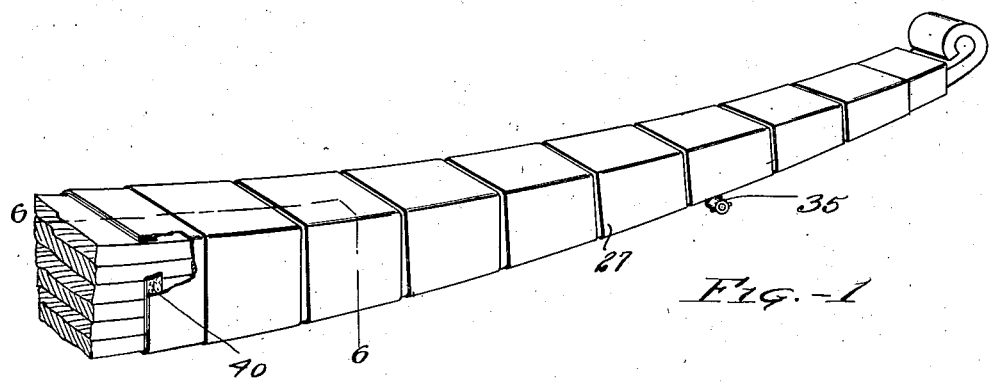
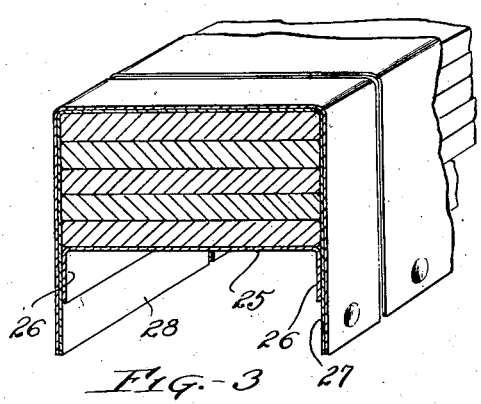
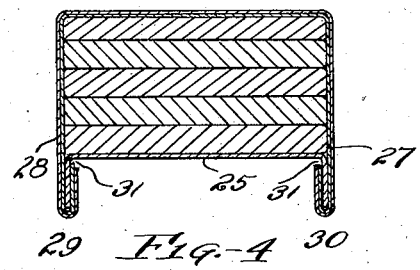
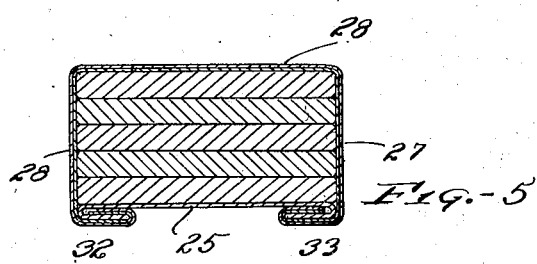
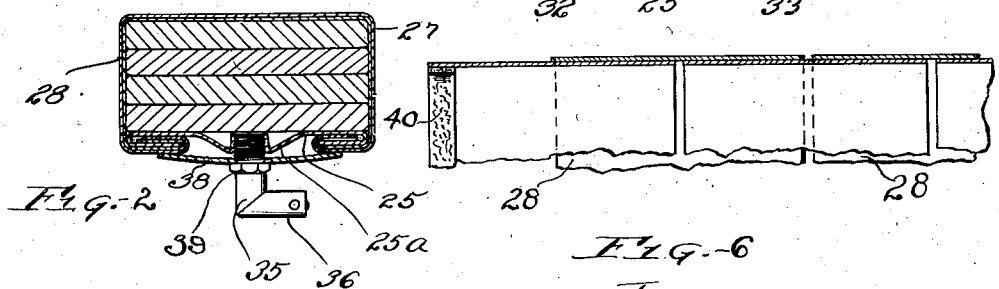
INVENTOR
Albert R. Goldrick,
By Bates & Macklin,
ATTORNEYS May 4, 1926.

A. R. GOLDRICK 1,583,546

VEHICLE SPRING COVER AND METHOD OF ASSEMBLING THE SAME

Filed Dec. 20, 1923    2 Sheets-Sheet 2

INVENTOR
Albert R Goldrick,
By Bates & Macklin,
ATTORNEYS

Patented May 4, 1926.

1,583,546

UNITED STATES PATENT OFFICE.

ALBERT R. GOLDRICK, OF CLEVELAND, OHIO, ASSIGNOR TO BENNO B. LEUSTIG, OF CLEVELAND, OHIO.

VEHICLE SPRING COVER AND METHOD OF ASSEMBLING THE SAME.

Application filed December 20, 1923. Serial No. 681,827.

*To all whom it may concern:*

Be it known that I, ALBERT R. GOLDRICK, a citizen of the United States, residing at Cleveland, in the county of Cuyahoga and State of Ohio, have invented a certain new and useful Improvement in a Vehicle Spring Cover and Method of Assembling the Same, of which the following is a full, clear, and exact description, reference being had to the accompanying drawings.

This invention is concerned with vehicle spring covers of the general class which completely enclose the four sides of a vehicle spring and which are adapted to receive lubricant, such as a heavy grease, under pressure whereby the lubricant can be forced throughout the length of the cover and incidentally between the vehicle spring leaves.

Economical manufacture of vehicle spring covers of the class referred to, involves many difficulties in that the commercial success of such a device is primarily dependent upon those structural characteristics which determine the degree to which it may fulfill its specified function, namely, constant lubrication and prevention of ingress of grit between the spring leaves; and the readiness with which a given sized cover may be applied to a certain make of spring of supposedly standard dimensions, but which in commercial practice vary considerably in depth, whereby the cover may closely embrace the four sides of the spring and thereby prevent vibration thereof.

The general object of the present invention, therefore, is the provision of a vehicle spring cover construction embodying characteristics, which are directed to fulfilling all of the foregoing requirements while furthering the economical manufacture of the cover.

A further object of my invention is the provision of a novel method of manufacturing and assembling vehicle spring covers whereby the covers may be positioned upon the springs of vehicles without necessitating a detachment of the spring from the vehicle and by which the cover may be so assembled thereupon as to firmly engage the top, sides and bottom of the spring leaves.

A further object of my invention is the provision of a spring cover construction which may be formed of metal to withstand comparatively high internal pressures incident to the injection of heavy lubricant thereinto and which may be flexible whereby it may readily conform to the deflective and reflexive movements of the spring leaves.

Other objects of my invention will hereinafter become apparent from the following description thereof, which refers to the accompanying drawings illustrating a preferred embodiment of the invention. The essential characteristics are summarized in the claims.

In the drawings Fig. 1 is a perspective view of a spring cover made in accordance with the objects of my invention and shown as being assembled upon a vehicle spring; Fig. 2 is a transverse section taken through the cover and spring at substantially the point of attachment for a lubricant injecting means such as a grease gun; Fig. 3 is a fragmentary perspective section of a metallic shell before it is completely assembled upon the spring leaves; Fig. 4 is a cross-sectional view illustrating a preferred manner of tightly fitting the shell to a vehicle spring of unknown depth; Fig. 5 is a cross-section similar to Fig. 4 but showing the cover as being completely assembled upon the spring; Fig. 6 is a longitudinal cross-section taken substantially along the line 6—6 of Fig. 1 and Figs. 7 to 9 inclusive illustrate a preferred manner of forming a channel shaped spring cover shell of laminated metallic strips.

Figure 8:
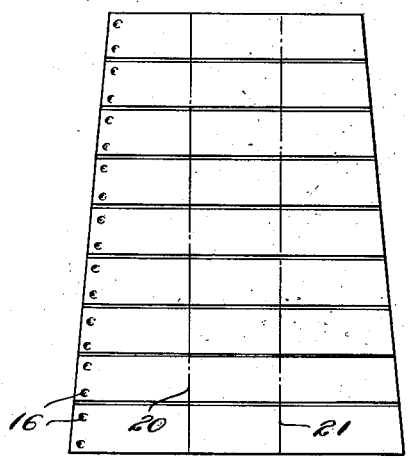
Figure 9:
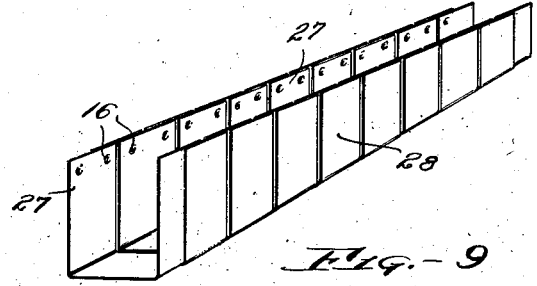

My invention contemplates the economical production of a vehicle spring cover which may be constructed in such manner as to eliminate the use of punches and dies in the manufacturing thereof. My cover is accordingly formed of metallic strips preferably of a uniform width, which may be spaced apart and joined together to form a plurality of laminated sheet metal blanks in the manner illustrated in Fig. 7 of the drawings. A layer of comparatively thin metallic strips 12 may be superimposed upon a second layer of similar strips 13. The respective layers of strips are joined together preferably by spot welding. For instance rows of spot welds 16 and 17 may be effected in any suitable manner, the angularity and spacing of the rows, relative to the side margins of the strips, of course, being dependent upon the length and width of cover to be made. The longitudinal spacing of the rows of welds may be such that the included length of the strips between the welds corresponds to the combined width of a double blank. The strips may then be sheared along a line intermediate the double rows of welds as indicated at 18 in Fig. 7. The double blank thus sheared may then be sheared along a line 19 whereby a single blank, such as is shown in Fig. 8, is obtained with the strips thereof joined along one longitudinal edge of the blank, while the strips are relatively free along the other longitudinal edge. The blank, as is shown in Fig. 8 may then be bent along the lines 20 and 21, the blank first being bent along the line 20, then along the line 21 whereby relative buckling or warping between the outer and inner layers of strips, is prevented. A blank bent in the manner described has the general appearance of the channel shaped cover shell illustrated in perspective in Fig. 9.

A source of considerable difficulty in manufacturing spring covers which will closely embrace the spring leaves whereby a rattling or vibrating of the cover may be prevented, is to be found in the variation in depth of so called standard springs, in that the thicknesses of the leaves vary considerably and thus cause a considerable variation in the depth of the spring. My invention, accordingly also contemplates the use of a novel method of assembling the cover upon the spring whereby a standard production of the cover shells, having the general characteristics of a channel such as I have hereinbefore described, may be maintained. This method may be also such that the shells may be individually fitted to the spring in such a simple and effective manner that the cost of this individual fitting becomes only an incident in the assembling of the shell upon the spring leaves. The cover closure means may comprise the fourth side or wall of the cover and may be particularly designed to carry out this simple method of assembling. The method, however, is such that the closure means may take a variety of forms, a preferred form being illustrated in the drawings.

As shown in Fig. 3, the fourth or closure side of the spring cover, may comprise a longitudinal strip 25 provided with flanges 26 extending throughout its length and may be of a substantial height. The side walls 27 and 28 of the shell are of such height as to be approximately equal to the tapering depth of the spring to be covered plus twice the height of the flanges 26 whereby the lower or free ends of the side walls may be folded or bent over the edges of the flanges of the strip as indicated at 29 and 30 in Fig. 4. It will be noted in Fig. 4 that a space, indicated at 31, will thus be present between the strip 25 and bent over edges of the side walls. This space corresponds to an allowance for adapting the particular channel shown, to a spring of less depth than the spring illustrated. The next step in completely closing the cover comprises bending the flanges 26 inwardly over the strip 25 as well as the portions of the side walls which are in engagement therewith, thus effecting the formation of closure seams extending throughout the length of the shell. Such seams are shown in cross-section at 32 and 33 of Fig. 5. This bending action has the effect of drawing the strips which comprise the shell, into close engagement with the spring as well as of maintaining the closure strip 25 in firm engagement with the spring along the bottoms of the leaves thereof. It should be noted here that if the springs were to be of a greater depth than the spring here illustrated, the closing thereof in the manner described, would only result in a greater clearance 31 between the side-wall edges of the channel side wall and the strip 25.

Any convenient means may be provided whereby a lubricant injecting device may be attached to the side or bottom of the cover to force grease or other lubricants throughout the length thereof. As shown in Fig. 2 I provide a grease gun coupling member 35 having an elbow extension 36 to which a grease gun may be connected. The member 35 may be attached to the closure strip of the cover preferably in the manner shown. The closure strip may therefore be properly formed as shown at 25$^a$ to provide a flanged opening which may be threaded to engage threads formed on the coupling member 35. If desired a clamping member 38 may be provided of sufficient width to engage the longitudinal closure seams of the cover and act as a clamping means therefor, the coupling member 35 being provided with a shoulder 39 to compress the clamping member 38 when the coupling member is being mounted upon the closure strip 25. It may be seen from the construction shown in Fig. 2 that a plurality of intermediately spaced clamping members may be disposed along the strip 25 and secured thereto by the use of bolts or studs to clamp the seams throughout the longitudinal extent of the cover. I find, however, that if sheet metal of a gauge which is thicker than the gauge of the metal strips in the side wall is used for forming the closure strip 25, the flanges 26, when seamed in the manner shown, in Fig. 5, will be of a sufficient thickness to maintain the cover in firm engagement with the spring leaves under all ordinary vehicle operating conditions.

The ends of the cover may be sealed when placed upon the spring by the use of packing bands 40 as shown in Fig. 1, which, when placed upon the spring in the manner shown may be tightly compressed into engagement with the spring leaves by reason of the drawing or tensioning of the end strips when the closure seams are being formed. This is particularly true of the end strips inasmuch as only a single layer of metal is present in the sides and top wall of the cover at the ends thereof.

From the foregoing description of my invention, it will be readily apparent that my method of assembling and fitting the cover to individual springs is applicable to a variety of forms of closure means or strips which are adapted to close the fourth side of the cover or shell. Furthermore it will be noted that a cover made in accordance with my invention may be readily placed upon the spring leaves without necessitating any disorganizing of the close fitting relationship of the strips or sections. This close fitting characteristic is highly important in order that the cover may properly retain the lubricant and is obtained incidently in the manufacturing of the cover in the manner described. It should also be noted that in the formation of blanks comprising joined strips or sections there will be no scrap or surplus trim metal as the length of the cover is varied simply by increasing or decreasing the number of strips comprising the shell.

I claim:

1. The method of forming and assembling spring covers which consists of forming a metallic channel shaped shell comprising substantially three sides of a cover, placing the shell upon a spring to be encased, assembling a metallic strip upon the spring to close the fourth side thereof, whereby the top and bottom walls of the casing may be closely juxtaposed to the spring and finally securing said strip to the side walls of the shell throughout the longitudinal extent thereof in such manner as to maintain said juxtaposition.

2. The method of forming and assembling spring covers which consists of forming a metallic channel shaped shell comprising substantially three sides of the cover, placing said shell upon a spring to be encased, assembling a metallic strip upon the spring to close the fourth side thereof and joining said strip to extensions of the side walls of the shell throughout the longitudinal extent of the shell whereby the top and bottom walls of the casing may be caused to closely embrace the top and bottom of the spring.

3. The method of forming and assembling spring covers which consists of forming a metallic channel shaped shell comprising substantially the top and sides of the cover, said sides being formed to be greater in dimension than the depth of the spring to be covered, placing the shell upon a spring, assembling a metallic strip by placing it between the side wall extensions of the shell, bending the extensions over the side margins of the strip whereby the top of the shell may be tightly positioned upon the top of the spring, while said strip fits closely along the bottom of the spring, and securing said extensions to the strip to maintain a close juxtaposition between the top and bottom walls of the casing with the top and bottom of the spring.

4. The method of forming and assembling spring covers which consists of forming a metallic shell comprising substantially three sides of a cover, placing the shell upon a spring to be encased, assembling a metallic strip upon the spring to close the fourth side thereof, whereby the top and bottom walls of the casing may be closely juxtaposed to the spring and finally securing said strip to the side walls of the shell by bending the longitudinal edges of the shell over the strip.

5. The method of forming and assembling spring covers which consists of forming a metallic shell comprising substantially three sides of the cover, placing said shell upon a spring to be encased, assembling a metallic strip upon the spring to close the fourth side thereof and bending the edges of the side walls of the shell over the strip throughout the longitudinal extent of the shell.

6. The method of assembling spring covers which consists of placing a shell comprising substantially three sides of a cover upon a spring to be encased, assembling a metallic strip upon the spring to close the fourth side thereof, whereby the top and bottom walls of the casing may be closely juxtaposed to the spring and finally securing said strip to the side walls of the shell by flanging the side walls while on the spring to overlie the strip.

7. The method of forming and assembling spring covers which consists of forming a metallic channel shaped shell fitting said shell upon a spring to be encased, joining a longitudinally extending strip comprising a closure for the cover to the side walls of the shell throughout the longitudinal extent of the shell whereby the top and bottom walls of the casing may be caused to closely embrace the top and bottom of the spring.

8. The method of forming and assembling spring covers which consists of forming a metallic shell comprising substantially the top and sides of the cover, said sides being formed to be greater in dimension than the depth of the spring to be covered, placing the shell upon a spring, assembling a flanged metallic strip by placing it between the side wall extensions of the shell, bending the extensions over the strip flanges whereby the top of the shell may be tightly fitted upon the top of the spring, while said strip closely embraces the bottom of the spring, and securing said extensions to the strip flanges.

9. The method of forming and assembling spring covers which consists of forming a metallic shell comprising substantially three sides of the cover, said sides being formed to be greater in dimension than the depth of the spring to be covered, placing the shell upon a spring, assembling a metallic strip by placing it between the side wall extensions of the shell, bending the extensions over the side margins of the strip whereby the top of the shell may be drawn tightly upon the spring and securing said extensions to the strip to maintain a close juxtaposition between the walls of the casing with the top, bottom and sides of the spring.

10. A spring cover of the character described comprising a series of U-shaped portions embracing three sides of the spring, there being intervening spaces between the portions, a second series of U-shaped portions overlying the first series and correspondingly spaced, said second series embracing the first series whereby the spaces between the portions of the first series are disposed intermediate the edges of the U-portions of the second series, both of said series of U-shaped portions being relatively free along one longitudinal edge thereof and rigidly fixed along the other longitudinal edge thereof.

11. In a vehicle spring cover the combination of a plurality of spaced apart sections adapted to embrace three sides of a vehicle spring, a second group of sections superimposed on the first sections and spaced apart relative to each other and means comprising the fourth side of the cover adapted to firmly engage sides of the sections and thereby close the cover.

12. A spring cover of the character described comprising a series of sheet metal portions adapted to embrace three sides of the spring, there being intervening spaces between the portions, a second series of sheet metal portions overlying the first series and correspondingly spaced, said second series embracing the first series, both of said series of metal portions being relatively free along one longitudinal edge thereof and rigidly fixed along the other longitudinal edge thereof and a closure means engaging said edges and adapted to maintain the cover in position on a vehicle spring.

13. A vehicle spring cover comprising a series of joined metallic strips including an outer layer of strips disposed relative to an inner layer, whereby each strip of the outer layer may overlap transverse edges of the strips in the inner layer, said strips being bent to embrace three sides of a vehicle spring and cover closure means engaging the ends of the strips to prevent relative movement of the longitudinal edges of the respective strips in each layer.

14. A vehicle spring cover comprising a series of metallic strips including an outer layer of strips welded to an inner layer, whereby each strip of the respective layers may overlap transverse edges of the strips in the other layer.

15. A vehicle spring cover comprising series of laminated metallic strips including an outer layer of strips disposed relative to an inner layer, whereby each strip of the respective layers may overlap transverse edges of the strips in the other layer, said strips being bent to embrace three sides of a vehicle spring and means engaging the ends of the strips to prevent relative longitudinal movement of the respective strips in each layer, said means comprising the fourth or closure side of the cover.

16. In a vehicle spring cover of the character described, the combination of a plurality of layers of welded metallic strips assembled in staggered relation whereby the strips in each layer will overlap the lateral edges of the strips in other layers, a longitudinal strip having the edges thereof formed to engage the longitudinal edges of said strips and clamping means for maintaining the respective edges in interengaging relation.

17. In a vehicle spring cover of the character described, the combination of a plurality of layers of metallic strips assembled in overlapping relation and a longitudinal strip having the edges thereof formed to engage the longitudinal edges of said strips and clamping means for maintaining the respective edges in interengaging relation.

18. In a vehicle spring cover of the character described, the combination of a plurality of layers of joined metallic strips assembled in overlapping relation whereby the strips in each layer will overlap the lateral edges of the strips in another layer or layers and a longitudinal strip having the edges thereof formed to engage the longitudinal edges of said strips.

19. A metallic blank adapted to be formed into a vehicle spring cover, comprising a plurality of sheet metal portions extending transversely of the blank and joined along one longitudinal edge of the blank.

20. As an article of manufacture, a metallic blank adapted to be formed into a leaf spring cover of trapezoidal outline and having a plurality of transversely extending portions joined along one edge of the blank.

21. As an article of manufacture, a metallic blank adapted to be formed into a leaf spring cover comprising a plurality of sheet metal portions extending transversely of the blank and welded together along one longitudinal edge of the blank.

22. As an article of manufacture, a metallic blank adapted to be formed into a vehicle spring cover comprising two layers of strips extending transversely of the blank, each layer of strips overlying the other whereby the strips in one layer may span the transverse edges of the underlying strips.

23. As an article of manufacture, a metallic blank adapted to be formed into a vehicle spring cover comprising two layers of strips extending transversely of the blank, each layer of strips overlying the other whereby each strip may span the transverse edges of an underlying strip, said strips being welded together along one longitudinal edge of the blank.

24. A metallic blank adapted to be formed into a vehicle spring cover, comprising a plurality of sheet metal portions extending transversely of the blank with spaces between adjacent portions and joined along one longitudinal edge of the blank.

25. As an article of manufacture, a metallic blank of trapezoidal outline and having a plurality of spaced apart transversely extending portions joined along one edge of the blank.

26. As an article of manufacture, a metallic blank comprising a plurality of sheet metal strips extending transversely of the blank and spaced apart and welded together along a longitudinal edge of the blank.

27. As an article of manufacture, a metallic blank adapted to be formed into a vehicle spring cover comprising a plurality of layers of strips extending transversely of the blank, each layer of strips overlying another whereby the strips in the blank may be spaced apart and be welded along one edge to form the blank.

28. As an article of manufacture, a metallic blank adapted to be formed into a vehicle spring cover comprising layers of strips extending transversely of the blank, each layer of strips overlying another whereby each strip may span the transverse edges of underlying strips, said strips in each layer being spaced apart and welded to the strips in another layer.

29. In a vehicle spring cover, a channel shaped shell formed to extend longitudinally of the vehicle spring, said channel comprising inner and outer layers of metallic strips adapted to extend transversely around a vehicle spring when the channel is positioned thereon.

30. In a vehicle spring cover, a channel shaped shell formed to extend longitudinally of the vehicle spring, said channel shell comprising layers of spaced apart metallic portions adapted to extend around a vehicle spring when the channel is positioned thereon, said transversely extending metallic portions being joined longitudinally of the channel.

31. In a vehicle spring cover, a channel formed member adapted to extend longitudinally of a vehicle spring when placed thereon, said channel comprising a plurality of metallic strips adapted to extend transversely around a vehicle spring when the channel member is positioned thereon.

32. In a vehicle spring cover, a channel shaped member formed to extend longitudinally of a vehicle spring when positioned thereon, said channel comprising spaced apart metallic portions adapted to extend transversely around the spring, said transversely extending metallic portions being joined longitudinally of the channel.

33. As an article of manufacture, a blank adapted to be formed into a vehicle spring cover comprising a plurality of spaced apart portions extending transversely of the blank and joined longitudinally of the blank.

34. In a vehicle spring cover, the combination of a plurality of spaced apart sections adapted to straddle three sides of a vehicle spring, and means extending longitudinally of the cover for closing the intervening spaces between said sections.

35. In a vehicle spring cover, the combination of a plurality of spaced apart sections extending longitudinally of the spring cover, and adapted when placed upon a vehicle spring to have their surfaces lie substantially in common planes.

36. In a vehicle spring cover, the combination of a plurality of spaced apart sections adapted to straddle three sides of a vehicle spring, and means comprising a fourth side of the cover for engaging said sections along longitudinal ends thereof and constituting a closure or fourth side for the cover.

In testimony whereof, I hereunto affix my signature.

ALBERT R. GOLDRICK.